(12) United States Patent
Sakurada et al.

(10) Patent No.: US 11,164,139 B2
(45) Date of Patent: Nov. 2, 2021

(54) TRUNK-SHARING SYSTEM, INFORMATION PROCESSING METHOD FOR TRUNK-SHARING, AND RECORDING MEDIUM HAVING PROGRAM STORED THEREIN

(71) Applicant: TOYOTA JIDOSHA KABUSHIKI KAISHA, Toyota (JP)

(72) Inventors: Shin Sakurada, Toyota (JP); Koichi Ando, Nagoya (JP); Mutsumi Matsuura, Okazaki (JP); Masato Endo, Nagakute (JP); Koki Fujita, Suginami-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 364 days.

(21) Appl. No.: 16/202,203

(22) Filed: Nov. 28, 2018

(65) Prior Publication Data
US 2019/0205818 A1     Jul. 4, 2019

(30) Foreign Application Priority Data

Dec. 28, 2017   (JP) ............................. JP2017-255021

(51) Int. Cl.
*G06Q 10/08*     (2012.01)
*G07C 9/00*      (2020.01)
(Continued)

(52) U.S. Cl.
CPC ........... *G06Q 10/083* (2013.01); *G06Q 10/02* (2013.01); *G06Q 50/30* (2013.01);
(Continued)

(58) Field of Classification Search
CPC ...... G06Q 10/083; G06Q 10/02; G06Q 50/30; G06Q 10/0833; G06Q 10/0835;
(Continued)

(56) References Cited

U.S. PATENT DOCUMENTS 9,508,204 B2    11/2016  Oz et al.
2015/0332531 A1  11/2015  Davidsson et al.
(Continued)

FOREIGN PATENT DOCUMENTS

JP    2003-187152 A    7/2003
JP    2006-206225      8/2006
(Continued)

OTHER PUBLICATIONS

Mashable.com, Volvo's in-car delivery service will bring packages to your trunk, available at: https://mashable.com/article/volvo-urb-it-in-car-delivery, last accessed Aug. 23, 2021 (Year: 2016).*

*Primary Examiner* — Emmett K. Walsh
(74) *Attorney, Agent, or Firm* — Oblon, McClelland, Maier & Neustadt, L.L.P.

(57) ABSTRACT

A trunk-sharing system that uses an interior space of a vehicle as a place in which a delivery object is delivered and received, the trunk-sharing system comprising a server configured to: i) acquire a vehicle information including information for identifying the vehicle when a predetermined service request has been issued; ii) acquire a predetermined authentication information for locking and unlocking a door of the vehicle based on the vehicle information; and iii) transmit at least the predetermined authentication information to a terminal which is used by a service provider.

12 Claims, 6 Drawing Sheets

(51) Int. Cl.
*G06Q 10/02* (2012.01)
*G06Q 50/30* (2012.01)

(52) U.S. Cl.
CPC ..... *G07C 9/00309* (2013.01); *G07C 9/00571* (2013.01); *G07C 9/00896* (2013.01); *G07C 2009/0092* (2013.01)

(58) Field of Classification Search
CPC ............ G06Q 10/0837; G07C 9/00309; G07C 9/00571; G07C 9/00896; G07C 2009/0092
See application file for complete search history.

(56) References Cited

U.S. PATENT DOCUMENTS

| | | |
|---|---|---|
| 2016/0098871 A1 | 4/2016 | Oz et al. |
| 2016/0099927 A1* | 4/2016 | Oz .................... H04W 12/0023 726/9 |
| 2016/0145045 A1* | 5/2016 | Mountz ................ B65G 1/137 700/216 |
| 2017/0017920 A1 | 1/2017 | Stark et al. |
| 2018/0158021 A1* | 6/2018 | Dautz ................ G07C 9/00571 |
| 2020/0090117 A1* | 3/2020 | Luo ..................... G06Q 10/083 |

FOREIGN PATENT DOCUMENTS

| | | | |
|---|---|---|---|
| JP | 2006206225 A * | 8/2006 | ......... G07C 9/00896 |
| JP | 2010-280482 | 12/2010 | |
| JP | 2014-127119 | 7/2014 | |
| JP | 2015-45141 | 3/2015 | |

\* cited by examiner

| USER ID | COLLECTION DATE AND TIME | COLLECTION PLACE | COLLECTION STATUS | PACKAGING MATERIAL INFORMATION |
|---|---|---|---|---|
| S001 | 01/11/2017 | VEHICLE | COMPLETED | ... |
| S002 | 02/11/2017 | HOUSE | COMPLETED | ... |
| S003 | 03/11/2017 | VEHICLE | NOT COMPLETED | ... |

| USER ID | VEHICLE MODEL | COLOR | NUMBER | VEHICLE POSITION |
|---|---|---|---|---|
| S001 | ... | WHITE | XXYY | ... |

VEHICLE SPECIFICATION INFORMATION

| USER ID | DELIVERY DATE AND TIME | DELIVERY PLACE | DELIVERY STATUS | DELIVERY TYPE |
|---|---|---|---|---|
| S001 | 01/11/2017 | VEHICLE | COMPLETED | 2 |
| S002 | 02/11/2017 | HOUSE | COMPLETED | 2 |
| S003 | 03/11/2017 | VEHICLE | NOT COMPLETED | 1 |

TRUNK-SHARING SYSTEM, INFORMATION PROCESSING METHOD FOR TRUNK-SHARING, AND RECORDING MEDIUM HAVING PROGRAM STORED THEREIN

INCORPORATION BY REFERENCE

The disclosure of Japanese Patent Application No. 2017-255021 filed on Dec. 28, 2017 including the specification, drawings and abstract is incorporated herein by reference in its entirety.

BACKGROUND

1. Technical Field

The disclosure relates to a trunk-sharing system, an information processing method for trunk-sharing, and a non-transitory computer-readable recording medium having a program stored therein.

2. Description of Related Art

Recently, a trunk-sharing system in which an interior space of a vehicle (for example, a space which can be accessed by unlocking and opening a lockable and unlockable door such as a cabin space which an occupant gets in or a luggage space in which luggage is accommodated) which is designated by a requester is used as a delivery place of a delivery object has been developed as means for efficiently performing delivery of a delivery object between a requester of a pickup and delivery service and a pickup and delivery person. For example, Japanese Unexamined Patent Application Publication No. 2006-206225 (JP 2006-206225 A) has proposed a system that performs an authentication process between a terminal of a pickup and delivery person and an onboard unit mounted in a designated vehicle when a pickup and delivery person performs pickup and delivery of a delivery object and permits locking and unlocking of the designated vehicle when the authentication has succeeded.

SUMMARY

In such a trunk-sharing system, when a pickup and delivery person delivers a delivery object, the delivery object is generally delivered in a state in which the delivery object is packaged in packaging material such as corrugated paper. Accordingly, when a frequency of delivery of a delivery object increases, a lot of packaging material remains in a location of a requester and thus there is a likelihood that the requester will feel inconvenient.

The disclosure provides a trunk-sharing system that can reduce inconvenience for a requester due to accumulation of packaging material at a location of the requester in a trunk-sharing system in which an interior space of a vehicle is used as a delivery place of a delivery object. The disclosure also provides an information processing method for trunk-sharing and a non-transitory computer-readable recording medium having a program stored therein.

In an aspect of the disclosure, when a predetermined service request (for example, a request for collecting packaging material, which has been used for packaging a delivery object, from an interior space of a vehicle) has been issued, predetermined authentication information for locking and unlocking a door of a vehicle is acquired based on vehicle information including information for identifying the vehicle, and the acquired predetermined authentication information is transmitted to a terminal of a service provider. An "interior space of a vehicle" which is mentioned herein is a space which can be accessed by unlocking and opening a lockable and unlockable door, such as a cabin space which an occupant gets in or a luggage space in which luggage is accommodated in a vehicle as described above.

An aspect of the disclosure relates to a trunk-sharing system that uses an interior space of a vehicle as a place in which a delivery object is delivered and received, the trunk-sharing system including a server configured to: i) acquire a vehicle information including information for identifying the vehicle when a predetermined service request has been issued; ii) acquire a predetermined authentication information for locking and unlocking a door of the vehicle based on the vehicle information; and iii) transmit at least the predetermined authentication information to a terminal which is used by a service provider.

In the above aspect, the predetermined service request may be a request for collecting a packaging material, which has been used to package the delivery object, from the interior space of the vehicle; and the service provider may be a person who performs an operation of collecting the packaging material.

When a user (a requester) or the like of a vehicle issues a collection request for packaging material which is left in the interior space of the vehicle, vehicle information including identification information of the vehicle is acquired by the server. The server acquires predetermined authentication information for locking and unlocking a door of the vehicle according to the acquired vehicle information. Then, the server transmits the predetermined authentication information to a terminal which is used by a service provider. When the predetermined authentication information is received by the terminal of the service provider, the door of the vehicle can be unlocked by the terminal. Accordingly, the service provider can open the door of the vehicle and collect packaging material which is left in the interior space of the vehicle. When an operation of locking the door of the vehicle is performed by the terminal of the service provider after such a collection operation has ended (after the door has been closed), the door is locked.

Accordingly, in the trunk-sharing system according to the above aspect, since an interior space of a vehicle can be used as a collection place of packaging material, it is possible to collect packaging material even when a user is absent without installing a home delivery locker or the like for collecting packaging material. As a result, it becomes difficult for packaging material to accumulate at a location of a user (a requester). Accordingly, it is possible to reduce inconvenience for a user (a requester) due to accumulation of packaging material at a location of the user (the requester).

Alternatively, in the above aspect, the predetermined service request may be a request for using the interior space of the vehicle as the place in which the delivery object is received; the service provider may be a person who performs an operation of delivering the delivery object; and the server may be configured to: i) generate a delivery type designation information in response to a request from a user of the vehicle, the delivery type designation information being for designating one delivery type of: a) a first delivery type in which the delivery object in a packaged state is accommodated in the interior space of the vehicle without being unpackaged; and b) a second delivery type in which the delivery object is unpackaged, a packaging material removed from the delivery object is collected, and the delivery object in an unpackaged state is accommodated in the interior space of the vehicle; and ii) transmit the predetermined authentication information and the delivery type designation information to the terminal which is used by the service provider.

When a delivery request with an interior space of a vehicle as a place in which a delivery object is received (a delivery destination) has been issued, vehicle information including identification information of the vehicle is acquired by the server. Then, the server acquires predetermined authentication information for locking and unlocking a door of the vehicle based on the acquired vehicle information. On the other hand, the server generates delivery type designation information for designating one delivery type of the first delivery type and the second delivery type in response to a request from a user of the vehicle. A "request from a user" mentioned herein is information indicating which delivery type of the first delivery type and the second delivery type the user desires. This information may be requested in advance or may be acquired from a terminal which is used by the user when the delivery type designation information is generated. Then, the server transmits the predetermined authentication information to a terminal of the service provider along with the delivery type designation information. When the predetermined authentication information is received by the terminal of the service provider, the door of the vehicle can be unlocked using the terminal. Accordingly, the service provider can open the door of the vehicle and deliver the delivery object to the interior space. At this time, when the delivery type designation information received by the terminal of the service provider is information for designating the first delivery type, the service provider can accommodate the delivery object in a packaged state in the interior space of the vehicle without unpackaging the delivery object. On the other hand, when the delivery type designation information received by the terminal of the service provider is information for designating the second delivery type, the service provider can unpackage the delivery object in the interior space of the vehicle, collect the packaging material removed from the delivery object, and accommodate the delivery object in an unpackaged state in the interior space of the vehicle. When an operation of locking the door of the vehicle is performed using the terminal of the service provider after such a delivery operation has ended (after the door has been closed), the door is locked.

Accordingly, in the trunk-sharing system according to the above aspect, when a delivery request with the interior space of a vehicle as a place in which a delivery object is received has been issued and a user of the vehicle requests the second delivery type, only the delivery object in an unpackaged state is accommodated in the interior space of the vehicle and thus the user does not need to perform an operation of unpackaging the delivery object. In addition, since packaging material is not temporarily left at a location of the user, it is possible to further reduce inconvenience for the user. Since a service provider does not need to move to the vehicle designated by a user both at the time of delivery of a delivery object and at the time of collection of packaging material, it is possible to achieve an increase in efficiency of a pickup and delivery operation and a collection operation. On the other hand, a user may not desire a delivery object unpackaging operation by a service provider depending on the preference of the user or a type of the delivery object. However, in this case, by allowing a user of the vehicle to request delivery of a delivery object in the first delivery type, the delivery object unpackaging operation is not performed by the service provider and thus a user's satisfaction is not impaired.

In the trunk-sharing system according to the above aspect, from the viewpoint of enhancement in security of a vehicle which is a delivery destination of a delivery object, a validity period may be set in the predetermined authentication information. The validity period is, for example, a period from a time point at which a vehicle unlocking operation is performed using a terminal of a service provider to a time point at which the predetermined authentication information is invalidated. When this validity period is set in the predetermined authentication information, unnecessary locking and unlocking of the door of the vehicle is restrained after the delivery object delivering operation has ended and thus it is possible to enhance security of the vehicle.

In the first delivery type, since a delivery object in a packaged state is accommodated in the interior space of the vehicle (that is, since only an operation of opening the door of the vehicle, an operation of placing the delivery object in the interior space, and an operation of closing the door of the vehicle need to be performed), a time required for the delivery object delivering operation is relatively short. However, in the second delivery type, since it is necessary to unpackage the delivery object, to collect packaging material removed from the delivery object, and to accommodate the delivery object in an unpackaged state in the interior space of the vehicle (that is, since an operation of opening the door of the vehicle, an operation of unpackaging the delivery object, an operation of collecting the packaging material removed from the delivery object, an operation of placing the delivery object in an unpackaged state in the interior space, and an operation of closing the door of the vehicle are necessary), the time required for the delivery object delivering operation is likely to increase. Accordingly, when a validity period is set in the predetermined authentication information and the validity period is set to a period which is relatively short on the assumption of the first delivery type, there is a likelihood that it would be difficult to complete the delivery operation of the second delivery type within the validity period. On the other hand, when the validity period is set to a period which is relatively long on the assumption of the second delivery type, there is a likelihood that the door of the vehicle will be unnecessarily locked or unlocked after the delivery operation of the first delivery type has been completed and thus there is a likelihood that a user will have concern for security.

Therefore, in the above aspect, the predetermined authentication information may include information for determining a validity period of the predetermined authentication information; and the validity period of the predetermined authentication information may be set to be longer when the delivery type designation information is information for designating the second delivery type than when the delivery type designation information is information for designating the first delivery type.

When the validity period of the predetermined authentication information changes depending on the delivery type of a delivery object in this way and the delivery operation of the first delivery type is performed, the validity period of the predetermined authentication information is not set to a period which is unnecessarily long and thus there is less concern for security such as unnecessary locking and unlocking of the door of the vehicle after the delivery operation has ended. On the other hand, when a delivery operation of the second delivery type is performed, the validity period of the predetermined authentication information is not set to a period which is excessively short and thus a situation in which the delivery operation cannot be completed within the validity period is not likely to occur.

Another aspect of the disclosure relates to an information processing method for trunk-sharing, the information processing method including: i) causing a computer to acquire a vehicle information including information for identifying a vehicle when a predetermined service request has been issued; ii) causing the computer to acquire a predetermined authentication information for locking and unlocking a door of the vehicle based on the vehicle information; and iii) causing the computer to transmit at least the predetermined authentication information to a terminal which is used by a service provider.

In the above aspect, the predetermined service request may be a request for collecting a packaging material, which has been used to package a delivery object, from an interior space of the vehicle; and the service provider may be a person who performs an operation of collecting the packaging material.

In the above aspect, the information processing method may further include: i) causing the computer to generate a delivery type designation information in response to a request from a user of the vehicle, the delivery type designation information being for designating one delivery type of: a) a first delivery type in which a delivery object in a packaged state is accommodated in an interior space of the vehicle without being unpackaged; and b) a second delivery type in which a delivery object is unpackaged, a packaging material removed from the delivery object is collected, and the delivery object in an unpackaged state is accommodated in an interior space of the vehicle; and ii) causing the computer to transmit the predetermined authentication information and the delivery type designation information to the terminal which is used by the service provider, wherein the predetermined service request may be a request for using the interior space of the vehicle as a place in which the delivery object is received; and the service provider may be a person who performs an operation of delivering the delivery object.

Another aspect of the disclosure relates to a non-transitory computer-readable recording medium storing a program causing a computer to perform a control process for a trunk-sharing system, the control process including: i) acquiring vehicle information including information for identifying a vehicle when a predetermined service request has been issued; ii) acquiring a predetermined authentication information for locking and unlocking a door of the vehicle based on the vehicle information; and iii) transmitting at least the predetermined authentication information to a terminal which is used by a service provider.

In the above aspect, the predetermined service request may be a request for collecting a packaging material, which has been used to package a delivery object, from an interior space of the vehicle; and the service provider may be a person who performs an operation of collecting the packaging material.

In the above aspect, the control process may further include: i) generating a delivery type designation information in response to a request from a user of the vehicle, the delivery type designation information being for designating one delivery type of: a) a first delivery type in which a delivery object in a packaged state is accommodated in an interior space of the vehicle without being unpackaged; and b) a second delivery type in which a delivery object is unpackaged, a packaging material removed from the delivery object is collected, and the delivery object in an unpackaged state is accommodated in an interior space of the vehicle; and ii) transmitting the predetermined authentication information and the delivery type designation information to the terminal which is used by the service provider, wherein the predetermined service request may be a request for using the interior space of the vehicle as a place in which the delivery object is received; and the service provider may be a person who performs an operation of delivering the delivery object.

According to the disclosure, in a trunk-sharing system in which an interior space of a vehicle is used as a delivery place of a delivery object, since packaging material can be appropriately collected at a location of a requester, it is possible to restrain packaging material from being accumulated at the location of the requester and thus to reduce inconvenience for the requester.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a specific embodiment of the disclosure will be described with reference to the accompanying drawings. Dimensions, materials, shapes, relative arrangements, and the like of constituent components which are described in this embodiment are not intended to limit the technical scope of the disclosure thereto unless otherwise described.

First Embodiment

First, a first embodiment of the disclosure will be described with reference to FIGS. 1 to 6. In this example, an embodiment of the disclosure will be described.

<Outline of Trunk-Sharing System>

Figure 1:
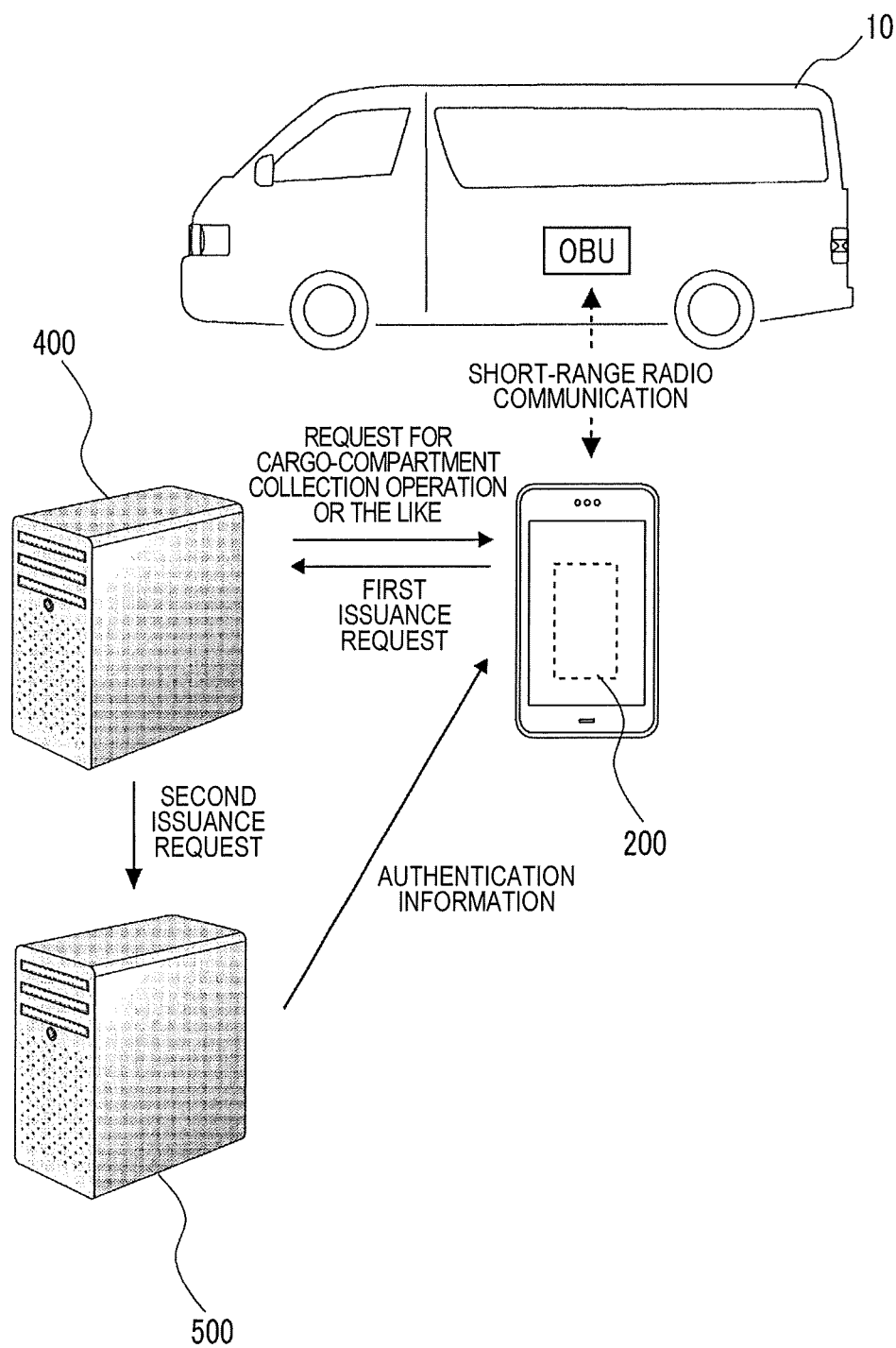
FIG. 1 is a diagram schematically illustrating a configuration of a trunk-sharing system according to a first embodiment.

FIG. 1 is a diagram schematically illustrating a configuration of a trunk-sharing system according to this example.

A trunk-sharing system which is mentioned herein is a system for realizing a packaging material collection service with an interior space of a vehicle as a delivery place by causing a person who requests a packaging material collecting operation and a person for which the packaging material collecting operation is requested to commonly use (share) the interior space of the vehicle which is designated by a requester. The trunk-sharing system according to this example includes an onboard unit OBU, a pickup and delivery communication device 200, a pickup and delivery management server 400, and a central server 500, as illustrated in FIG. 1.

The onboard unit OBU is mounted in a vehicle (hereinafter also referred to as a "user vehicle") 10 which is designated by a user who is a requester of a packaging material collecting operation and which is owned or borrowed by the user. The onboard unit OBU performs a predetermined authentication process based on predetermined authentication information which is transmitted from the pickup and delivery communication device 200 and determines whether a locking/unlocking request from the pickup and delivery communication device 200 is to be accepted based on the authentication result. In this example, the interior space of the user vehicle 10 in which the onboard unit OBU is mounted is used as a collection place of packaging material.

The pickup and delivery communication device 200 is mounted in a terminal which is carried by a pickup and delivery person (an example of the "service provider" of the disclosure) or a terminal which is disposed in a vehicle (a pickup and delivery vehicle). The pickup and delivery person is a person actually performing a packaging material collecting operation (hereinafter also referred to as a "cargo-compartment collection operation") with the interior space of the user vehicle 10 as a delivery place. The pickup and delivery vehicle is used for the pickup and delivery person to perform the cargo-compartment collection operation. When a pickup and delivery person performs the cargo-compartment collection operation, the pickup and delivery communication device 200 acquires predetermined authentication information, and locks and unlocks a door of the user vehicle 10 by transmitting a locking/unlocking request including the acquired predetermined authentication information to the onboard unit OBU.

The pickup and delivery management server 400 is disposed in a company having received a request for the cargo-compartment collection operation, a company that provides a service required for the company to perform the cargo-compartment collection operation, or the like. When a packaging material collection request is received from a user, the pickup and delivery management server 400 requests the central server 500 to transmit predetermined authentication information for locking and unlocking the door of the user vehicle 10 to the pickup and delivery communication device 200. This request includes identification information of a user who is a requester of the cargo-compartment collection operation.

The central server 500 identifies the user vehicle 10 correlated with the user identification information based on the user identification information received from the pickup and delivery management server 400 and transmits predetermined authentication information associated with the identified user vehicle 10 to the pickup and delivery communication device 200. When the predetermined authentication information transmitted from the central server 500 is received by the pickup and delivery communication device 200, a pickup and delivery person can unlock the door of the user vehicle 10 using the pickup and delivery communication device 200. Accordingly, the pickup and delivery person can collect the packaging material accommodated in the interior space of the user vehicle 10. The predetermined authentication information may be transmitted from the central server 500 to the pickup and delivery communication device 200 via the pickup and delivery management server 400.

<System Configuration>

Figure 2:
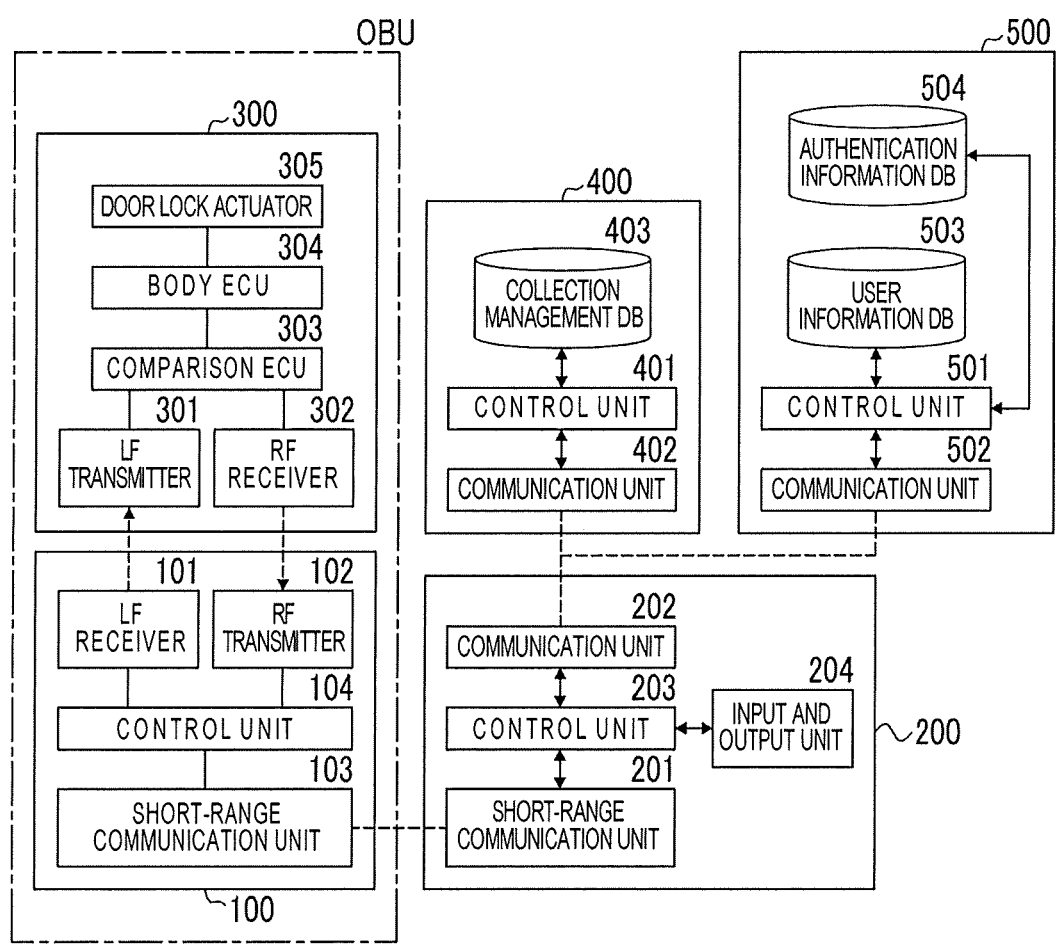
FIG. 2 is a block diagram schematically illustrating an example of elements of the trunk-sharing system according to the first embodiment.

The elements of the trunk-sharing system will be described below in detail. FIG. 2 is a block diagram schematically illustrating an example of configurations of the onboard unit OBU, the pickup and delivery communication device 200, the pickup and delivery management server 400, and the central server 500 which are illustrated in FIG. 1.

(Onboard Unit OBU)

The onboard unit OBU includes a key unit 100 and a locking/unlocking device 300 as illustrated in FIG. 2. The key unit 100 includes the same radio interface as an electronic key (a portable unit) of a smart key, and can perform locking and unlocking of a user vehicle 10 without using any physical key by communicating with an existing locking/unlocking device 300. The key unit 100 authenticates the pickup and delivery communication device 200 by performing short-range radio communication with the pickup and delivery communication device 200, and determines whether it serves as an electronic key for the user vehicle 10 based on the authentication result. The key unit 100 and the locking/unlocking device 300 operate with electric power which is supplied from a battery mounted in the user vehicle 10.

The locking/unlocking device 300 is a device that locks and unlocks a door of the user vehicle 10 and is an existing device constituting a part of a smart key system. Specifically, the locking/unlocking device 300 locks and unlocks the door of the user vehicle 10 in accordance with a locking signal and an unlocking signal which are transmitted from an electronic key (hereinafter referred to as a portable unit) carried by a user of the user vehicle 10 using radio waves of a radio frequency (hereinafter referred to as RF) band. The locking/unlocking device 300 also has a function of transmitting radio waves of a low frequency (hereinafter referred to as LF) band for detecting the portable unit. In this example, the key unit 100 instead of the portable unit carried by the user controls locking and unlocking of the door of the user vehicle 10 by transmitting and receiving radio waves of an RF band and an LF band to and from the locking/unlocking device 300. In the following description, unless otherwise mentioned, the communication destination of the locking/unlocking device 300 is limited to the key unit 100.

Specific configurations of the locking/unlocking device 300 and the key unit 100 will be described now. First, the locking/unlocking device 300 includes an LF transmitter 301, an RF receiver 302, a comparison ECU 303, a body ECU 304, and a door lock actuator 305. The LF transmitter 301 is means that transmits radio waves of an LF band (for example, 100 KHz to 300 KHz) for detecting (polling) the key unit 100. The LF transmitter 301 is incorporated, for example, into a center console or in the vicinity of a steering wheel in the passenger compartment. The RF receiver 302 is means that receives radio waves of an RF band (for example, 100 MHz to 1 GHz) transmitted from the key unit 100. The RF receiver 302 is incorporated at any position in the passenger compartment.

The comparison ECU 303 is a computer that performs control for locking and unlocking the door of the user vehicle 10 based on a signal (a locking signal or an unlocking signal) transmitted from the key unit 100 using radio waves of an RF band. The comparison ECU 303 is constituted, for example, by a microcomputer. In the following description, the locking signal and the unlocking signal are collectively referred to as a locking/unlocking signal. The term, locking/unlocking signal, represents at least one of the locking signal and the unlocking signal.

The comparison ECU 303 authenticates whether the locking/unlocking signal transmitted from the key unit 100 is transmitted from a rightful device. Specifically, the comparison ECU 303 determines whether a key ID included in the locking/unlocking signal coincides with a key ID stored in advance in a storage unit of the comparison ECU 303. Then, the comparison ECU 303 transmits an unlocking command or a locking command to the body ECU 304 based on the determination result. The unlocking command or the locking command is transmitted via an onboard network such as a controller area network (CAN).

The door lock actuator 305 is an actuator that locks and unlocks the door of the user vehicle 10 (such as a passenger compartment door which is opened and closed at the time of a driver or a passenger getting into and out of a cabin space as a passenger compartment, or a cargo compartment door which is opened and closed at the time of accommodating luggage in a luggage space which is a space for accommodating luggage). The door lock actuator 305 operates based on a signal transmitted from the body ECU 304. The door lock actuator 305 may be configured to independently lock and unlock the passenger compartment door and the cargo compartment door of the user vehicle 10.

The body ECU 304 is a computer that executes body control of the user vehicle 10. The body ECU 304 has a function of unlocking and locking the door of the user vehicle 10 by controlling the door lock actuator 305 based on the unlocking command or the locking command received from the comparison ECU 303.

The key unit 100 will be described below. The key unit 100 is a device that is disposed at a predetermined position (for example, inside a glove box) in the passenger compartment of the user vehicle 10. The key unit 100 has a function of authenticating the pickup and delivery communication device 200 by performing short-range radio communication with the pickup and delivery communication device 200 and a function of transmitting the locking/unlocking signal using radio waves of an RF band when the authentication has succeeded. The key unit 100 includes an LF receiver 101, an RF transmitter 102, a short-range communication unit 103, and a control unit 104.

The LF receiver 101 is means that receives a polling signal transmitted from the locking/unlocking device 300 using radio waves of an LF band. The LF receiver 101 includes an antenna for receiving radio waves of an LF band (hereinafter referred to as an LF antenna). The RF transmitter 102 is means that transmits a locking/unlocking signal to the key unit 100 using radio waves of an RF band.

The short-range communication unit 103 is means that communicates with the pickup and delivery communication device 200. The short-range communication unit 103 performs communication in a short range (at a distance at which communication can be performed between the interior and the exterior of the vehicle) using a predetermined radio communication standard. In this example, the short-range communication unit 103 performs data communication based on a Bluetooth (registered trademark) Low Energy standard (hereinafter referred to as BLE). BLE is a low-energy communication standard using Bluetooth (registered trademark), and is characterized in that communication can be started immediately when a communication partner is detected without requiring pairing between devices. In this example, BLE is exemplified, but another radio communication standard can also be used. For example, near field communication (NFC), ultra-wideband (UWB), or WiFi (registered trademark) may be used.

The control unit 104 is a computer that performs short-range radio communication with the pickup and delivery communication device 200 via the short-range communication unit 103 and performs a process of authenticating the pickup and delivery communication device 200 and a process of transmitting a locking/unlocking signal based on the authentication result. The control unit 104 is constituted, for example, by a microcomputer.

Figures 3, 4, 5:
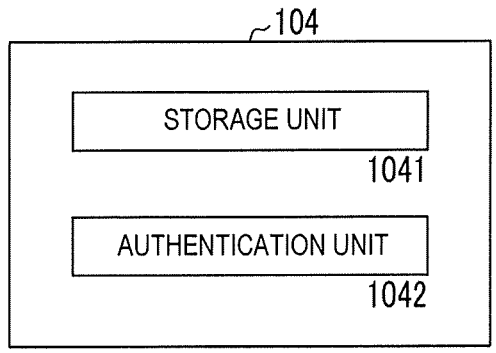
FIG. 3 is a diagram illustrating an example of functional modules which are included in a control unit of a key unit.
FIG. 4 is a diagram illustrating a table structure of collection information which is stored in a collection management DB.
FIG. 5 is a diagram illustrating a table structure of vehicle management information which is stored in the collection management DB.

Functional modules included in the control unit 104 are illustrated in FIG. 3. As illustrated in FIG. 3, the control unit 104 includes a storage unit 1041 and an authentication unit 1042. A control program for controlling the key unit 100 is stored in the storage unit 1041. The control unit 104 may realize various functional units including the authentication unit 1042 by causing a CPU (not illustrated) to execute the control program stored in the storage unit 1041. For example, the control unit 104 may realize a function of receiving a polling signal transmitted as radio waves of an LF band from the locking/unlocking device 300 via the LF receiver 101, a function of transmitting a locking/unlocking signal as radio waves of an RF band to the locking/unlocking device 300 via the RF transmitter 102, a function of processing communication with the pickup and delivery communication device 200 which is performed by the short-range communication unit 103, and a function of generating a locking/unlocking signal when authentication of the pickup and delivery communication device 200 by the authentication unit 1042 has succeeded.

The authentication unit 1042 authenticates the pickup and delivery communication device 200 based on authentication information included in a locking request or an unlocking request (hereinafter collectively referred to as a locking/unlocking request) transmitted from the pickup and delivery communication device 200. Specifically, the authentication unit 1042 compares the authentication information received from the pickup and delivery communication device 200 with authentication information stored in the storage unit 1041 (authentication information specific to the key unit 100), and determines that the authentication has succeeded when both pieces of authentication information coincide with each other. When both pieces of authentication information do not coincide with each other, the authentication unit 1042 determines that the authentication has failed.

When the authentication of the pickup and delivery communication device 200 by the authentication unit 1042 has succeeded, a locking/unlocking signal generated in response to a request received from the pickup and delivery communication device 200 is transmitted to the locking/unlocking device 300 via the RF transmitter 102. The authentication method which is performed by the authentication unit 1042 may be a method of verifying coincidence through simple comparison of the authentication information or may be a method using an asymmetric cipher. In the following description, the authentication information stored in the storage unit 1041 of the key unit 100 is referred to as device authentication information and the authentication information transmitted from the pickup and delivery communication device 200 is referred to as terminal authentication information (which corresponds to an example of "predetermined authentication information" of the disclosure), if necessary.

The key unit 100 transmits an ID of an electronic key (hereinafter referred to as a key ID) along with the locking/unlocking signal to the locking/unlocking device 300. The key ID may be stored in the key unit 100 in a plaintext state in advance or may be stored in a state in which it is encrypted using a cipher specific to the pickup and delivery communication device 200. When the key ID is stored in an encrypted state, the encrypted key ID may be decrypted using the terminal authentication information transmitted from the pickup and delivery communication device 200 to acquire the original key ID.

(Pickup and Delivery Communication Device 200)

The pickup and delivery communication device 200 will be described now. The pickup and delivery communication device 200 is mounted in a terminal which is carried by a pickup and delivery person who performs a cargo-compartment collection operation, or a terminal which is disposed in a pickup and delivery vehicle used for the pickup and delivery person to perform the cargo-compartment collection operation as described above. At this time, the terminal in which the pickup and delivery communication device 200 is mounted is a small computer such as a smartphone, a mobile phone, a tablet terminal, a personal information terminal, or a wearable computer (such as a smart watch). The pickup and delivery communication device 200 includes a short-range communication unit 201, a communication unit 202, a control unit 203, and an input and output unit 204.

The short-range communication unit 201 is means that performs communication with the key unit 100 using the same communication standard as the short-range communication unit 103 of the key unit 100. The communication unit 202 is communication means that connects the pickup and delivery communication device 200 to a network. In this embodiment, the pickup and delivery communication device 200 can communicate with another device (for example, the pickup and delivery management server 400 or the central server 500) via the network using a mobile communication service such as 3G (3rd Generation) or LTE (Long Term Evolution).

The control unit 203 is a computer that takes charge of control of the pickup and delivery communication device 200. The control unit 203 performs, for example, a process of acquiring the terminal authentication information, a process of generating a locking/unlocking request including the acquired terminal authentication information, and a process of transmitting the generated locking/unlocking request to the key unit 100. The control unit 203 is constituted, for example, by a microcomputer, and the functions of performing the above-mentioned processes are realized by causing a CPU (not illustrated) to execute a program stored in storage means (such as a ROM) (not illustrated).

The control unit 203 performs an interaction with a pickup and delivery person via the input and output unit 204. The input and output unit 204 is means that receives an input operation which has been performed by the pickup and delivery person and presents information to the pickup and delivery person. Specifically, the input and output unit 204 includes a touch panel and control means thereof and a liquid crystal display and control means thereof. The touch panel and the liquid crystal display are constituted as a single touch panel display in this example.

The control unit 203 displays an operation screen on the input and output unit 204 and generates a locking/unlocking request based on an operation which has been performed by the pickup and delivery person. For example, the control unit 203 outputs an icon for unlocking, an icon for locking, and the like to the touch panel display and generates an unlocking request or a locking request based on the operation which has been performed by the pickup and delivery person. The operation which is performed by the pickup and delivery person is not limited to an operation using the touch panel display. For example, the operation may be performed using a hardware switch.

The control unit 203 performs a process of acquiring terminal authentication information from the central server 500. The terminal authentication information is not information (a key ID) which is used for the locking/unlocking device 300 to authenticate the key unit 100, but is information (for example, information correlated with device authentication information specific to the key unit 100) which is used for the key unit 100 to authenticate the terminal in which the pickup and delivery communication device 200 is mounted. Specifically, the control unit 203 transmits a first issuance request to the pickup and delivery management server 400 via the communication unit 202. Here, the "first issuance request" includes: terminal identification information for identifying the terminal in which the pickup and delivery communication device 200 is mounted; and a signal for requesting issuance of terminal authentication information. The pickup and delivery management server 400 having received the first issuance request determines whether the first issuance request has been transmitted from a rightful terminal based on the terminal authentication information included in the first issuance request. When it is determined that the first issuance request has been transmitted from a rightful terminal, the pickup and delivery management server 400 transmits a second issuance request to the central server 500. Here, the "second issuance request" includes user identification information for identifying a user who is a requester of the cargo-compartment collection operation and a signal for requesting issuance of terminal authentication information. The central server 500 having received the second issuance request identifies the user vehicle 10 correlated with the user identification information based on the user identification information included in the second issuance request. Subsequently, the central server 500 acquires terminal authentication information correlated with the device authentication information specific to the key unit 100 mounted in the identified user vehicle 10, and directly transmits the acquired terminal authentication information to the pickup and delivery communication device 200 or transmits the terminal authentication information to the pickup and delivery communication device 200 via the pickup and delivery management server 400. Accordingly, operations for unlocking and locking the user vehicle 10 can be performed using the pickup and delivery communication device 200. When the pickup and delivery communication device 200 does not include terminal authentication information, the operations of unlocking and locking the user vehicle 10 using the pickup and delivery communication device 200 are not enabled.

In this example, the terminal authentication information acquired by the pickup and delivery communication device 200 is a one-time key which is invalidated with locking of the door due to ending of the cargo-compartment collection operation as a trigger. For example, the terminal authentication information is stored in a storage unit (not illustrated) of the pickup and delivery communication device 200 at a time at which the terminal authentication information transmitted from the central server 500 is received by the pickup and delivery communication device 200, and then the terminal authentication information is deleted from the storage unit at a time at which a locking notification is received by the pickup and delivery communication device 200. The locking notification is transmitted from the key unit 100 when a door locking operation has been performed due to ending of the cargo-compartment collection operation. The time at which the terminal authentication information stored in the storage unit of the pickup and delivery communication device 200 is deleted is not limited to this example, and may be a time at which a predetermined validity period has elapsed from the time at which a door unlocking operation due to starting of the cargo-compartment collection operation has been performed. The terminal authentication information is not limited to a one-time key described above, and may be a permanent key. Regardless of whether the terminal authentication information is a one-time key or a permanent key, it is assumed that device authentication information correlated with the terminal authentication information is stored in advance in the key unit 100.

(Pickup and Delivery Management Server 400)

The pickup and delivery management server 400 will be described now. The pickup and delivery management server 400 is a computer including a processor (not illustrated) such as a central processing unit (CPU) or a digital signal processor (DSP), a main storage unit (not illustrated) such as a random access memory (RAM) and a read only memory (ROM), and an auxiliary storage unit (not illustrated) such as an erasable programmable ROM (EPROM), a hard disk drive (HDD), and a removable medium. The removable medium is, for example, a universal serial bus (USB) memory or a disk recording medium such as a compact disc (CD) or a digital versatile disc (DVD). An operating system (OS), various programs, various tables, and the like are stored in the auxiliary storage unit, and functions matching a predetermined purpose can be realized by loading a program stored therein into a work area of the main storage unit, executing the loaded program, and controlling the constituent units through execution of the program.

The pickup and delivery management server 400 includes a communication unit 402. The communication unit 402 is communication means that connects the pickup and delivery management server 400 to a network. For example, the communication unit 402 performs communication with the central server 500 via a communication network such as a local area network (LAN), a wide area network (WAN), or WiFi, and performs communication with the pickup and delivery communication device 200 via a network using a mobile communication service as described above.

The pickup and delivery management server 400 includes a collection management database (DB) 403. The collection management DB 403 is configured to store collection information in the auxiliary storage unit in which correlation between identification information of a user who is a requester for the cargo-compartment collection operation and the collection information is performed. The collection management DB 403 is constructed by causing a program of a database management system (DBMS) which is executed by the processor to manage data stored in the auxiliary storage unit. The collection management DB 403 is, for example, a relational database.

An example of a structure of collection information stored in the collection management DB 403 will be described below with reference to FIG. 4. FIG. 4 is a diagram illustrating a table structure of collection information. A collection information table illustrated in FIG. 4 includes fields of user ID, collection date and time, collection place, collection status, and packaging material information. User identification information for identifying a user is input to the field of user ID. Information indicating a date and time at which packaging material is collected is input to the field of collection date and time. Particularly, regarding the collection time, a specific time may be input or a specific time period in which collection is requested may be input. Information indicating a collection place of packaging material is input to the field of collection place. For example, "vehicle" is input when the collection place of packaging material is the interior space of the user vehicle 10, and "house" is input when the collection place is a house such as a user's home. Information indicating whether a packaging material collecting operation has been completed by a pickup and delivery person is input to the field of collection status. For example, "completed" is input when the packaging material collecting operation has been completed, and "not completed" is input when the packaging material collecting operation has not been completed. Information such as the size or the amount of packaging material is input to the field of packaging material information.

In the pickup and delivery management server 400, a control unit 401 is embodied as a functional unit realized by execution of a program by the processor. The control unit 401 performs management control such as registration and update of collection information in the collection management DB 403. For example, when a packaging material collection request has been issued from a user, the control unit 401 correlates the collection date and time, and the collection place, and the like with the user identification information of the user, generates collection information corresponding to the user, and registers the generated collection information in the collection management DB 403. When a request for change of the collection date and time, the collection place, or the like has been issued from the user after the collection information has been registered in the collection management DB 403, the control unit 401 updates registered details in the collection management DB 403 in response to the request for change. The control unit 401 also updates information on the collection status by communicating with the pickup and delivery communication device 200 via the communication unit 502.

When a user vehicle 10 has been designated as a collection place of packaging material, vehicle management information in which a user and a user vehicle 10 are correlated is also stored in the collection management DB 403. An example of a structure of vehicle management information will be described below with reference to FIG. 5. FIG. 5 is a diagram illustrating a table structure of vehicle management information. A vehicle management information table illustrated in FIG. 5 includes fields of user ID, vehicle specification information, and vehicle position. The same user identification information as in the field of user ID in the collection management DB 403 is registered in the field of user ID. Information (such as a vehicle model, a color of a vehicle body, and a number (a number plate)) required for a pickup and delivery person to visually specify the user vehicle 10 as a collection place of packaging material is registered in the field of vehicle specification information. Information indicating a position at which the user vehicle 10 is parked is registered in the field of vehicle position. The position information of the user vehicle 10 is registered based on a request from the user. When a communication device capable of communicating with the central server 500 is mounted in the user vehicle 10, the control unit 401 may acquire position information of the user vehicle 10 which has been ascertained by the central server 500 via the communication device from the central server 500 via the communication unit 402 and register the acquired position information in the field of vehicle position.

The control unit 401 transmits a request for a collection operation to the pickup and delivery communication device 200 such that a pickup and delivery person can perform a cargo-compartment collection operation based on the collection information and the vehicle management information correlated with the user. Here, the "request for a collection operation" includes, for example, a collection date and time, a collection place, packaging material information, vehicle specification information, and vehicle position information. The request for a collection operation may be transmitted to the pickup and delivery communication device 200 a plurality of times, not only once. For example, requests associated with collection operations on the next day may be transmitted to the pickup and delivery communication device 200 together on the day before a scheduled collection date, and the requests may be transmitted again to the pickup and delivery communication device 200 on the day of the scheduled collection date. When the collection information or the vehicle management information has been changed (updated) at the time of transmitting the request to the pickup and delivery communication device 200 again, requests including the changed details are transmitted.

One of the functional elements of the pickup and delivery management server 400 or some of the processes thereof may be embodied by another computer connected to the pickup and delivery management server 400 via a network. A sequence of processes which are performed by the pickup and delivery management server 400 may be implemented in hardware or may be implemented in software.

(Central Server 500)

The central server 500 will be described below. The central server 500 also has a general configuration of a computer, and a basic hardware configuration thereof is the same as the pickup and delivery management server 400 and includes a processor, a main storage unit, and an auxiliary storage unit which are not illustrated. Functions matching a predetermined purpose can be realized by loading a program stored in the auxiliary storage unit into a work area of the main storage unit, executing the loaded program, and controlling the constituent units through execution of the program. The central server 500 includes a communication unit 502. The communication unit 502 is functionally the same as the communication unit 402 of the pickup and delivery management server 400 and performs communication between the central server 500 and another device (for example, the pickup and delivery management server 400).

The central server 500 includes a user information DB 503 and an authentication information DB 504 that store a variety of information in the auxiliary storage unit. Such databases (DB) are constructed by causing a program of a database management system which is executed by the processor to manage data stored in the auxiliary storage unit. The user information DB 503 and the authentication information DB 504 are, for example, relational databases.

The user information DB 503 stores user identification information for identifying a user and user vehicle identification information for identifying a user vehicle 10 which is owned or borrowed by the user in correlation with each other.

The authentication information DB 504 stores user vehicle identification information for identifying a user vehicle 10, device authentication information specific to the key unit 100 mounted in the user vehicle 10, and terminal authentication information correlated with the device authentication information in correlation with each other. The authentication information DB 504 may store information on a validity period of the terminal authentication information, information of whether the terminal authentication information is invalidated, and the like. The information on the validity period of the terminal authentication information may be transmitted along with the terminal authentication information to the pickup and delivery communication device 200 at the time of transmission of the terminal authentication information to the pickup and delivery communication device 200. In this case, as described above, the pickup and delivery communication device 200 can invalidate the terminal authentication information by deleting the terminal authentication information stored in the storage unit of the pickup and delivery communication device 200 when the validity period has expired after the time at which a door unlocking operation has been performed due to start of the cargo-compartment collection operation.

In the central server 500, a control unit 501 is embodied as a functional unit realized by causing the processor to execute a program. The control unit 501 performs control associated with issuance of authentication information to the pickup and delivery communication device 200 or the like. Specifically, when a second issuance request transmitted from the pickup and delivery management server 400 has been received by the communication unit 502, first, the control unit 501 derives user vehicle identification information corresponding to the user identification information included in the second issuance request by accessing the user information DB 503. Subsequently, the control unit 501 derives terminal authentication information corresponding to the user vehicle identification information derived from the user information DB 503 by accessing the authentication information DB 504. Then, the control unit 501 transmits terminal authentication information (and information on the validity period) derived from the authentication information DB 504 to the pickup and delivery communication device 200 via the communication unit 502. At this time, the terminal authentication information may be directly transmitted to the pickup and delivery communication device 200 or may be transmitted to the pickup and delivery communication device 200 via the pickup and delivery management server 400.

One of the functional elements of the central server 500 or some of the processes thereof may be embodied by another computer connected to the central server 500 via a network. A sequence of processes which are performed by the central server 500 may be implemented in hardware or may be implemented in software.

<Operations of System>

Figure 6:
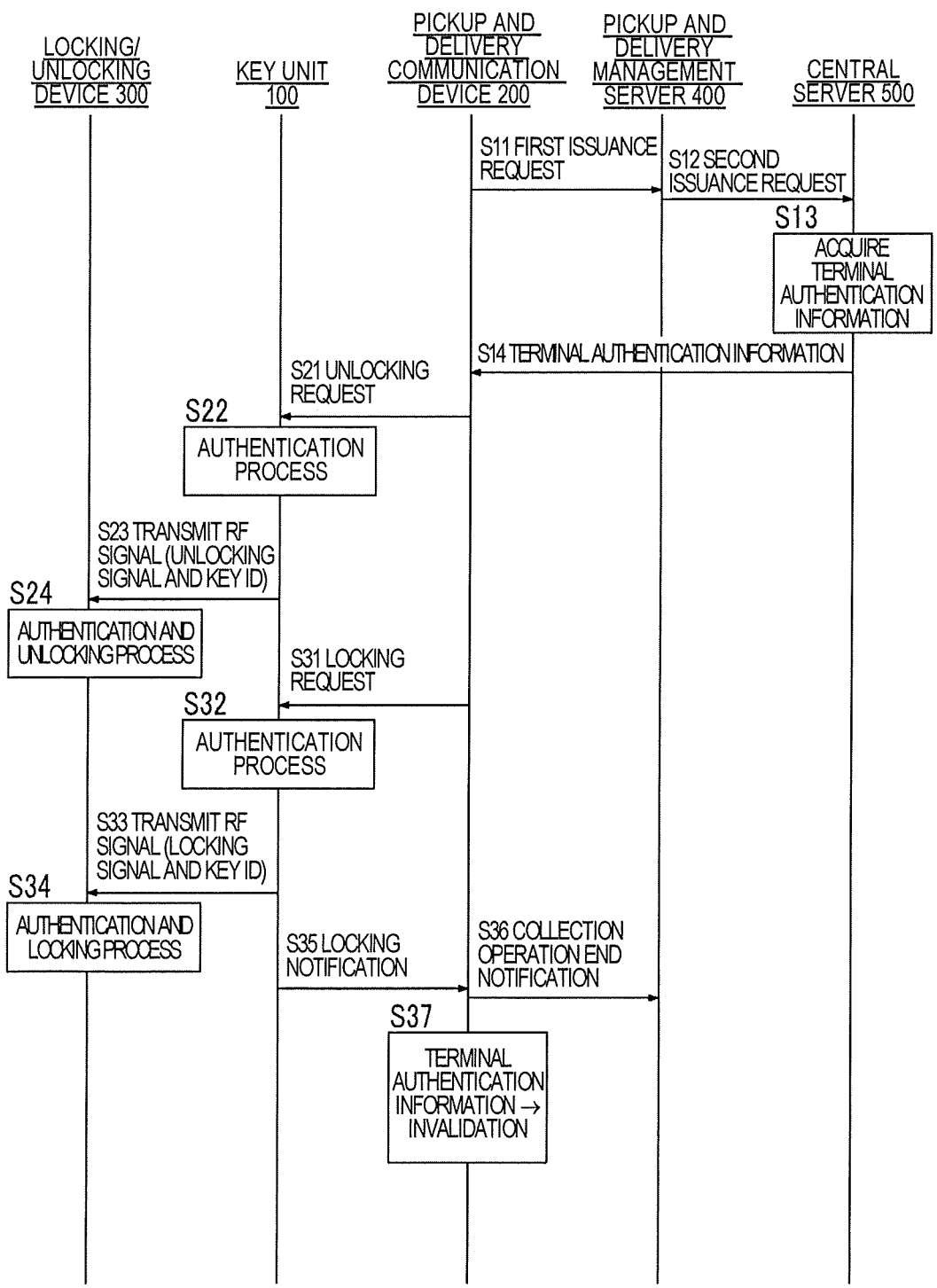
FIG. 6 is a flow diagram illustrating a flow of data and processes which are performed between the elements of the trunk-sharing system according to the first embodiment.

Operations of the trunk-sharing system when a cargo-compartment collection operation is performed by a pickup and delivery person will be described below with reference to FIG. 6. FIG. 6 is a flowchart illustrating a flow of data which is transmitted and received between the elements and processes which are performed by the elements. In the flow illustrated in FIG. 6, it is assumed that a person who has received a request for collection of packaging material from a user of a user vehicle 10 notifies a pickup and delivery person who performs a cargo-compartment collection operation of request details in advance. That is, it is assumed that the "collection operation request (such as a collection date and time, a collection place, packaging material information, vehicle specification information, and vehicle position information)" is transmitted from the pickup and delivery management server 400 to the pickup and delivery communication device 200 in advance.

First, when a pickup and delivery person performs an operation of requesting issuance of terminal authentication information via the input and output unit 204 of the pickup and delivery communication device 200, the pickup and delivery communication device 200 transmits a first issuance request including identification information of the terminal in which the pickup and delivery communication device 200 is mounted to the pickup and delivery management server 400 in Step S11.

When the first issuance request transmitted from the pickup and delivery communication device 200 has been received by the pickup and delivery management server 400, the pickup and delivery management server 400 determines whether the first issuance request has been transmitted from a rightful terminal based on the terminal authentication information included in the first issuance request. When it is determined that the first issuance request has been transmitted from a rightful terminal, the pickup and delivery management server 400 transmits a second issuance request including identification information of a user who is a requester for the cargo-compartment collection operation to the central server 500 in Step S12.

When the second issuance request transmitted from the pickup and delivery management server 400 has been received by the central server 500, the central server 500 derives user vehicle identification information corresponding to the user identification information based on the user identification information included in the second issuance request. By causing the central server 500 to derive the user vehicle identification information using this method, an example of a function of the server in the disclosure is implemented. The central server 500 acquires terminal authentication information correlated with the device authentication information specific to the key unit 100 mounted in the user vehicle 10 based on the user vehicle identification information (Step S13). By causing the central server 500 to perform the process of Step S13, an example of a function of the server in the disclosure is implemented. Then, the central server 500 transmits the terminal authentication information acquired in Step S13 to the pickup and delivery communication device 200 (Step S14). By causing the central server 500 to perform the process of Step S14, an example of a function of the server in the disclosure is implemented. The terminal authentication information acquired by the central server 500 may be transmitted from the central server 500 to the pickup and delivery communication device 200 via the pickup and delivery management server 400. When the terminal authentication information transmitted from the central server 500 has been received by the pickup and delivery communication device 200, the user vehicle 10 can be locked and unlocked using the pickup and delivery communication device 200.

Then, in Steps S21 to S24, a process of unlocking the door of the user vehicle 10 is performed using the pickup and delivery communication device 200. In performing the processes of Steps S21 to S24, it is assumed that the terminal having the pickup and delivery communication device 200 mounted therein is moved to a position at which short-range radio communication between the key unit 100 of the user vehicle 10 and the pickup and delivery communication device 200 is set up by a pickup and delivery person having referred to the vehicle specification information or the vehicle position information.

When the pickup and delivery person performs an operation of unlocking the user vehicle 10 via the input and output unit 204 of the pickup and delivery communication device 200, the pickup and delivery communication device 200 transmits an unlocking request including terminal authentication information to the key unit 100 in Step S21. Then, when the unlocking request transmitted from the pickup and delivery communication device 200 has been received by the key unit 100, the key unit 100 performs an authentication process by comparing the device authentication information stored in advance with the terminal authentication information included in the unlocking request in Step S22. When authentication using the terminal authentication information and the device authentication information has succeeded, the key unit 100 transmits an unlocking signal and a key ID to the locking/unlocking device 300 in Step S23. When the unlocking signal and the key ID transmitted from the key unit 100 have been received by the locking/unlocking device 300, the locking/unlocking device 300 performs an authentication process based on the received key ID in Step S24. As a result, when the authentication has succeeded, the door of the user vehicle 10 is unlocked. At this time, answerback or the like may be returned.

In Step S31 to S37, a process of locking the user vehicle 10 using the pickup and delivery communication device 200 is performed. When the pickup and delivery person closes the door of the user vehicle 10 and then performs an operation of locking the user vehicle 10 via the input and output unit 204 of the pickup and delivery communication device 200, the pickup and delivery communication device 200 transmits a locking request including terminal authentication information to the key unit 100 in Step S31. When the locking request transmitted from the pickup and delivery communication device 200 has been received by the key unit 100, the key unit 100 performs an authentication process by comparing the terminal authentication information included in the locking request transmitted from the pickup and delivery communication device 200 with device authentication information stored in advance therein in Step S32. When authentication using the terminal authentication information and the device authentication information has succeeded, the key unit 100 transmits a locking signal and a key ID to the locking/unlocking device 300 in Step S33. When the locking signal and the key ID transmitted from the key unit 100 has been received by the locking/unlocking device 300, the locking/unlocking device 300 performs an authentication process based on the received key ID in Step S34. That is, the locking/unlocking device 300 determines whether the key ID received from the key unit 100 coincides with the key ID stored in advance in the locking/unlocking device 300. When the authentication has succeeded, the door of the user vehicle 10 is locked. After transmitting the locking signal to the locking/unlocking device 300, the key unit 100 transmits a notification (a locking notification) indicating that locking has been completed to the pickup and delivery communication device 200 (Step S35). Accordingly, the notification indicating that locking has been completed is output onto the touch panel screen of the pickup and delivery communication device 200. As a result, when such a notification has been received by the pickup and delivery communication device 200, the pickup and delivery communication device 200 generates a notification indicating that the cargo-compartment collection operation has ended and transmits the generated notification to the pickup and delivery management server 400 in Step S36. When the notification indicating that the cargo-compartment collection operation has ended has been transmitted to the pickup and delivery management server 400, the pickup and delivery communication device 200 invalidates the terminal authentication information, which has been acquired from the central server 500 in Step S14, in Step S37. That is, the terminal authentication information stored in the storage unit of the pickup and delivery communication device 200 is deleted from the storage unit. When a validity period is set in the terminal authentication information transmitted from the central server 500, the pickup and delivery communication device 200 may invalidate the terminal authentication information acquired from the central server 500 in Step S14 when the validity period has elapsed from the time at which the process of Step S21 (the process of transmitting an unlocking request to the key unit 100) has been performed.

In the above-mentioned trunk-sharing system, when a user leaves packaging material used for packaging a delivery object in the interior space of a user vehicle 10, the packaging material is collected by a pickup and delivery person. Accordingly, without providing a home delivery locker for collecting packaging material or the like, it is possible to collect packaging material even when a user is absent. As a result, since it becomes difficult to accumulate packaging material at the location of the user, it is possible to reduce inconvenience for the user. Since locking and unlocking of a door associated with a packaging material collecting operation is performed by the pickup and delivery communication device 200 has succeeded in authentication through a predetermined authentication process, it is possible to restrain a third party from locking and unlocking a door of a vehicle.

Modified Example of First Embodiment

In the trunk-sharing system according to the first embodiment, in order to cause a pickup and delivery person to collect packaging material accommodated in the interior space of a user vehicle 10, it is necessary for a user to perform a procedure for requesting a cargo-compartment collection operation. On the other hand, when collection conditions that the amount of packaging material accommodated in the interior space of a user vehicle 10 is equal to or greater than a predetermined amount, a total volume of packaging material accommodated in the interior space of the user vehicle 10 is equal to or greater than a predetermined volume, or the like have been satisfied, the pickup and delivery management server 400 may consider that a packaging material collection request has been issued and automatically transmit a request for a cargo-compartment collection operation to the pickup and delivery communication device 200. According to this configuration, even when a user does not individually issue a request for a cargo-compartment collection operation, an operation of collecting packaging material accommodated in the user vehicle 10 is automatically performed by a pickup and delivery person. In this case, detection means that can detect the amount or the size of packaging material or the like in the interior space of the user vehicle 10 and communication means that can transmit information on the amount or the size of packaging material detected by the detection means or the like to the pickup and delivery communication device 200 can be mounted in advance in the user vehicle 10.

Here, as a method of implementing the detection means, a method of attaching an IC tag, on which reading and writing of information indicating the size of packaging material or the like is possible, to packaging material and installing a reader and writer that can perform writing information to the IC tag and reading of information written to the IC tag in the interior space of the user vehicle 10 can be used. As a method of implementing the communication means, a method of mounting a communication device, which can transmit and receive information to and from the reader and writer in a wired or wireless manner and transmit and receive information to and from the pickup and delivery communication device 200, in the user vehicle 10 can be used. The pickup and delivery management server 400 can calculate the amount or the total volume of packaging material accommodated in the interior space of the user vehicle 10 based on information received from the communication device and determine whether the calculate number or the calculated total volume has satisfied the above-mentioned collection conditions. As a result, when it is determined that the collection conditions have been satisfied, the pickup and delivery management server 400 can consider that a packaging material collection request has been issued and transmit a request for a cargo-compartment collection operation to the pickup and delivery communication device 200.

As another method of implementing the detection means, a camera that can image the interior space of the user vehicle 10 may be mounted in the user vehicle 10. In this case, the communication device can transmit an image captured by the camera to the pickup and delivery management server 400. When an image transmitted from the communication device has been received by the pickup and delivery management server 400, the pickup and delivery management server 400 can calculate the amount or the total volume of packaging material accommodated in the interior space of the user vehicle 10 by analyzing an image captured by the camera.

According to this modified example, even when a user does not individually perform a procedure for requesting a cargo-compartment collection operation, packaging material accommodated in the interior space of the user vehicle 10 is automatically collected and thus it is possible to improve convenience for a user.

The trunk-sharing system according to the disclosure is not limited to the configurations described in the first embodiment and the modified example of the first embodiment, but may be constructed by a single computer (or server) that can be connected to a network or may be constructed by a plurality of computers (and/or servers) that can be connected to a network. When the trunk-sharing system according to the disclosure is constructed by a plurality of computers (and/or servers), the elements of the trunk-sharing system may be distributed and constructed by two or more computers (and/or servers).

Second Embodiment

Figures 7, 8:
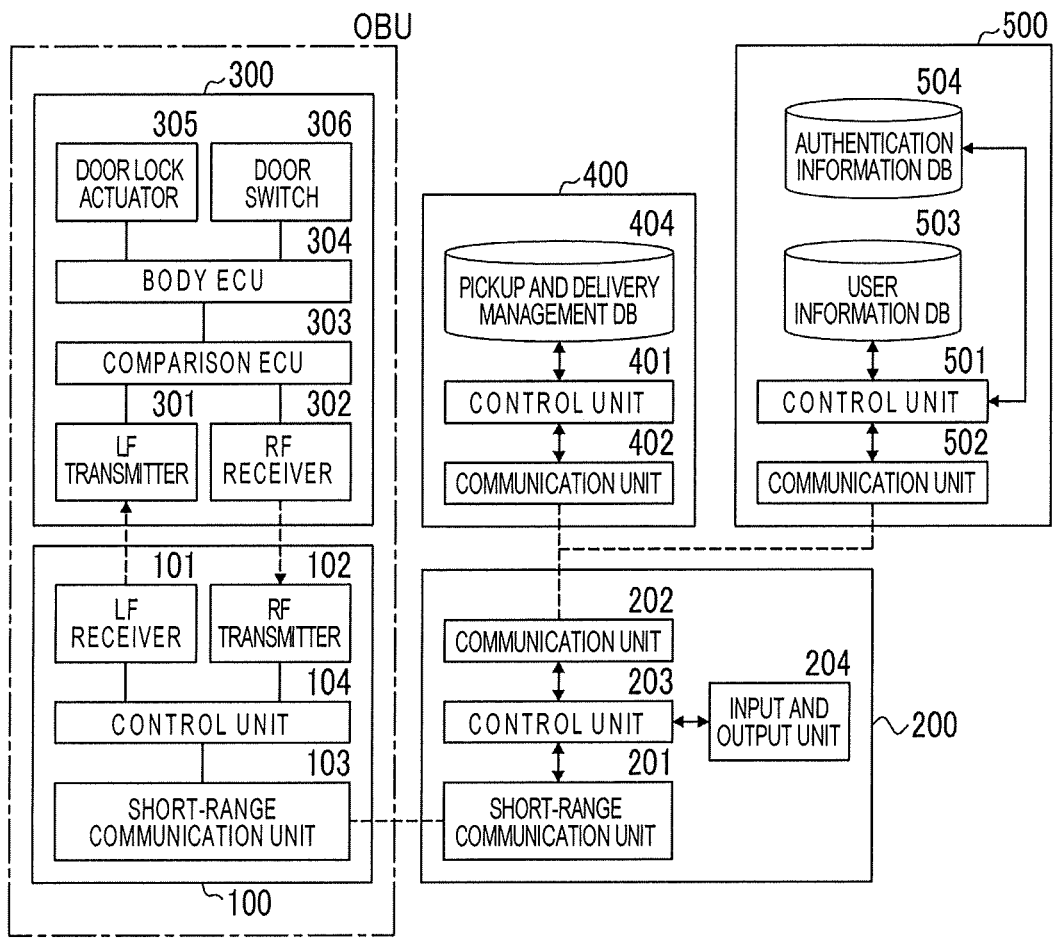
FIG. 7 is a block diagram schematically illustrating an example of elements of the trunk-sharing system according to the second embodiment.
FIG. 8 is a diagram illustrating a table structure of delivery information which is stored in a pickup and delivery management DB.
Figure 9:
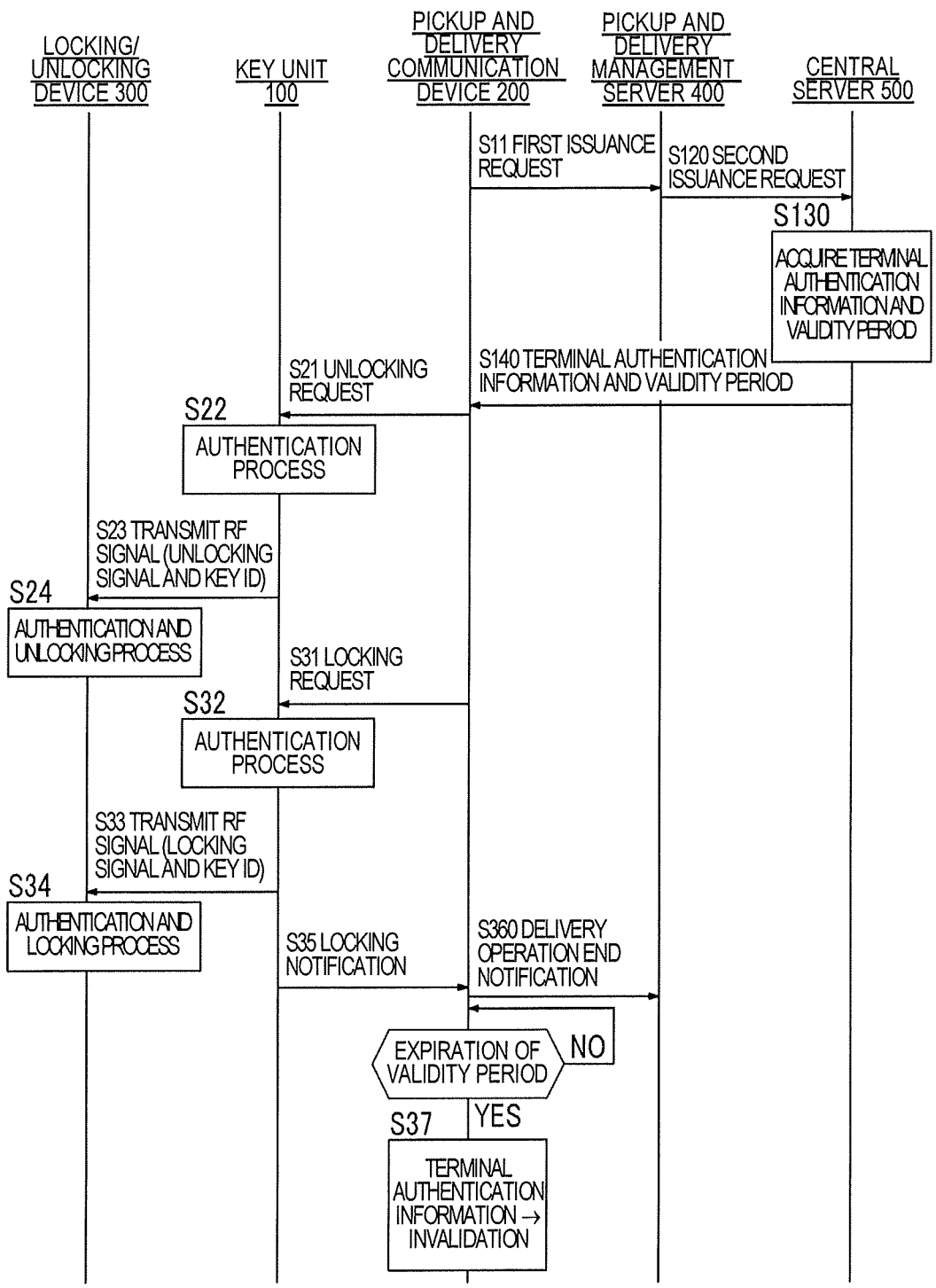
FIG. 9 is a flow diagram illustrating a flow of data and processes which are performed between the elements of the trunk-sharing system according to the second embodiment.

A second embodiment of the disclosure will be described below with reference to FIGS. 7 to 9. In this example, an embodiment of the disclosure will be described. In the first embodiment, a cargo-compartment collection operation is performed in a state in which packaging material has been accommodated in advance in the interior space of a user vehicle 10 by a user. In this case, after a user has received a delivery object in a packaged state, the user needs to unpackage the delivery object and accommodate the packaging material removed from the delivery object in the interior space of the user vehicle 10. On the other hand, in this example, when a delivery request using the interior space of the user vehicle 10 as a place in which a delivery object is received (a delivery destination) has been issued and a pickup and delivery person accommodates (delivers) the delivery object in the interior space of the user vehicle 10, the pickup and delivery person unpackages the delivery object and collects the packaging material removed from the delivery object (accommodates only the unpackaged delivery object in the interior space).

Similarly to the first embodiment, the trunk-sharing system according to this example includes an onboard unit OBU, a pickup and delivery communication device 200, a pickup and delivery management server 400, and a central server 500. In the pickup and delivery management server 400 according to this example, a pickup and delivery management database (DB) 404 is provided instead of the collection management DB 403 in the first embodiment as illustrated in FIG. 7. The pickup and delivery management DB 404 is configured to store delivery information in the auxiliary storage unit in which correlation between identification information of a user who is a receiver of a pickup and delivery object (a delivery object) and delivery information is performed. The pickup and delivery management DB 404 is constructed by causing a program of a database management system (DBMS) which is executed by the processor to manage data stored in the auxiliary storage unit. The pickup and delivery management DB 404 is, for example, a relational database.

An example of a structure of delivery information stored in the pickup and delivery management DB 404 will be described below with reference to FIG. 8. FIG. 8 is a diagram illustrating a table structure of delivery information. A delivery information table illustrated in FIG. 8 includes fields of user ID, delivery date and time, delivery place, delivery status, and delivery type. User identification information for identifying a user is input to the field of user ID. Information indicating a date and time at which a delivery object is delivered is input to the field of delivery date and time. Particularly, regarding the delivery time, a specific time may be input or a specific time period in which delivery is requested may be input. Information indicating a delivery destination (a receiving place) of a delivery object is input to the field of delivery place. For example, "vehicle" is input when the delivery destination of a delivery object is the interior space of a user vehicle 10, and "house" is input when the delivery destination is a house such as a user's home. Information indicating whether an operation of delivering a delivery object has been completed by a pickup and delivery person is input to the field of delivery status. For example, "completed" is input when the operation of delivering a delivery object has been completed, and "not completed" is input when the operation of delivering a delivery object has not been completed. Information for designating a delivery type required by a user is input to the field of delivery type. For example, when a delivery type (a first delivery type) in which a delivery object is not unpackaged and the delivery object in a packaged state is accommodated in the interior space of a user vehicle 10 is required by a user at the time of delivery of the delivery object, "1" as information for designating the first delivery type is input to the field of delivery type. When a delivery type (a second delivery type) in which a delivery object is unpackaged, packaging material removed from the delivery object is collected, and the delivery object in an unpackaged state is accommodated in the interior space of the user vehicle 10 is required by a user at the time of delivery of the delivery object, "2" as information for designating the second delivery type is input to the field of delivery type.

The control unit 401 of the pickup and delivery management server 400 performs management and control such as registration or update of delivery information in the pickup and delivery management DB 404. For example, when a delivery request for a delivery object has been issued, a delivery date and time, a delivery place, and a delivery type, and the like are correlated with user identification information of a user who is a receiver of the delivery object to generate delivery information corresponding to the user and the generated delivery information is registered in the pickup and delivery management DB 404. By causing the pickup and delivery management server 400 to generate delivery information using this method, an example of a function of the server in the disclosure is implemented. A "delivery request for a delivery object" is information including user identification information, a delivery date and time, a delivery place, and a delivery type and is transmitted from a user or a delivery source of the delivery object. When a request for change of a delivery date and time, a delivery place, a delivery type, or the like has been issued from a user or a delivery source of the delivery object after delivery information thereof has been registered in the pickup and delivery management DB 404, the control unit 401 updates details registered in the pickup and delivery management DB 404 in response to the request for change. In addition, the control unit 401 updates information on the delivery status by communicating with the pickup and delivery communication device 200 via the communication unit 502.

When the interior space of a user vehicle 10 has been designated as a delivery destination of a delivery object, vehicle management information in which a user is correlated with the user vehicle 10 is also stored in the pickup and delivery management DB 404. At this time, the vehicle management information is stored in the pickup and delivery management DB 404 in a table form including fields of user ID, vehicle specification information, and vehicle position, similarly to the vehicle management information stored in the collection management DB 403 in the first embodiment.

Then, similarly to the first embodiment, the central server 500 according to this example realizes the functions of the central server 500 using a user information DB 503, an authentication information DB 504, a communication unit 502, and a control unit 501. Here, it is assumed that the authentication information DB 504 stores a validity period of terminal authentication information as necessary information in addition to user vehicle identification information for identifying a user vehicle 10, device authentication information specific to the key unit 100 mounted in the user vehicle 10, and terminal authentication information correlated with the device authentication information. The validity period of the terminal authentication information in this example changes depending on a delivery type of a delivery object. Specifically, when a delivery type of a delivery object is the second delivery type, the control unit 501 sets the validity period of the terminal authentication information to be longer in comparison with a case in which the delivery type is the first delivery type. This because a delivery object in a packaged state is accommodated in the interior space as it were and thus a time required for the operation of delivering the delivery object is relatively short in the first delivery type, but in the second delivery type, a delivery object is unpackaged, packaging material removed from the delivery object is collected, the delivery object in an unpackaged state is accommodated in the interior space, and thus the time required for the operation of delivering the delivery object is relatively long. In order to change the validity period of the terminal authentication information depending on the delivery type as described above, the control unit 501 needs to ascertain the delivery type of the delivery object. Therefore, in this example, when the second issuance request is transmitted from the pickup and delivery management server 400 to the central server 500, the pickup and delivery management server 400 also transmits the second issuance request including information indicating the delivery type of the delivery object in addition to the user identification information for identifying a user who is a receiver of the delivery object and a signal for requesting issuance of terminal authentication information. When the second issuance request has been received by the communication unit 502 of the central server 500, the control unit 501 can set the validity period of the terminal authentication information based on delivery type information included in the second issuance request.

<Operations of System>

Operations of the trunk-sharing system when a delivery object delivering operation is performed by a pickup and delivery person will be described below with reference to FIG. 9. FIG. 9 is a flowchart illustrating a flow of data which is transmitted and received between the elements and processes which are performed by the elements. In the flow illustrated in FIG. 9, it is assumed that registration of delivery information in the pickup and delivery management DB 404 has been completed by a user who is a receiver of a delivery object or a person who has received a "request for delivery of a delivery object (information including user identification information, a delivery date and time, a delivery place, and a delivery type)" from a delivery source of the delivery object. In the flow illustrated in FIG. 9, it is assumed that a person who has received a request for delivery of a delivery object notifies details of the request to a pickup and delivery person who performs a delivery operation in advance. In the flow illustrated in FIG. 9, the same processes as in the flow illustrated in FIG. 6 in the first embodiment are referred to by the same reference signs. In the following description, processes different from the flow illustrated in FIG. 6 will be mainly described and the same processes will not be repeated.

When a first issuance request transmitted from the pickup and delivery communication device 200 has been received by the pickup and delivery management server 400, the pickup and delivery management server 400 determines whether the first issuance request has been transmitted from a rightful terminal based on terminal authentication information included in the first issuance request. When it is determined that the first issuance request has been transmitted from a rightful device, the pickup and delivery management server 400 transmits a second issuance request including delivery type information requested by the user in addition to the identification information of a user who is a requester for a cargo-compartment collection operation and a signal for requesting issuance of terminal authentication information to the central server 500 in step S120.

When the second issuance request transmitted from the pickup and delivery management server 400 has been received by the central server 500, the central server 500 derives user vehicle identification information corresponding to the user identification information based on the user identification information included in the second issuance request. By causing the central server 500 to derive the user vehicle identification information using this method, an example of a function of the server in the disclosure is implemented. Then, the central server 500 acquires terminal authentication information correlated with the device authentication information specified to the key unit 100 mounted in the user vehicle 10 based on the user vehicle identification information and sets a validity period of the terminal authentication information based on the delivery type information included in the second issuance request (Step S130). By causing the central server 500 to acquire terminal authentication information in the process of Step S130, an example of a function of the server in the disclosure is implemented. Then, the central server 500 transmits information for designating a delivery type included in the second issuance request to the pickup and delivery communication device 200 in addition to the terminal authentication information acquired from the central server 500 in the process of Step S130 and information on the validity period of the terminal authentication information (Step S140). By causing the central server 500 to perform the process of Step S140, an example of a function of the server in the disclosure is implemented. The terminal authentication information, the information on the validity period of the terminal authentication information, and the information for designating the delivery type may be transmitted from the central server 500 to the pickup and delivery communication device 200 via the pickup and delivery management server 400.

Thereafter, when the processes of Steps S21 to S24 and the processes of Steps S31 to S35 are appropriately performed by the pickup and delivery communication device 200, the key unit 100, and the locking/unlocking device 300, the pickup and delivery communication device 200 having received a locking notification from the key unit 100 generates a notification indicating that the operation of delivering the delivery object has been completed and transmits the generated notification to the pickup and delivery management server 400 in Step S360. When the notification indicating that the cargo-compartment collection operation has ended has been transmitted to the pickup and delivery management server 400 and when the validity period has elapsed from the time point at which the process of Step S21 (the process of transmitting an unlocking request to the key unit 100) has been performed, the pickup and delivery communication device 200 invalidates the terminal authentication information acquired from the central server 500 in Step S140. That is, the terminal authentication information stored in the storage unit of the pickup and delivery communication device 200 is deleted from the storage unit.

In the above-mentioned trunk-sharing system, when a user requests a delivery operation in the second delivery type in a case in which the interior space of a user vehicle 10 is used as a receiving place for the delivery object, a pickup and delivery person performs unpackaging of the delivery object and collecting of packaging material removed from the delivery object and thus the delivery object in an unpackaged state is accommodated in the interior space of the user vehicle 10. Accordingly, since the user does not have to unpackage the delivery object and packaging material does not temporarily remain at the location of the user, it is possible to further reduce inconvenience for the user. Since a pickup and delivery person does not need to move to a location of a user vehicle 10 at the time of delivery of a delivery object and move to a location of a user vehicle 10 again at the time of collection of packaging material, it is possible to achieve an increase in efficiency of the delivery operation and the collection operation. On the other hand, a user who does not desire unpackaging of a delivery object by a pickup and delivery person can receive a delivery object in a packaged state by requesting a delivery operation in the first delivery type, and thus the user's satisfaction is not impaired.

In the above-mentioned trunk-sharing system, since the validity period of terminal authentication information is changed depending on the delivery type of a delivery object, problems in security such as unnecessary locking and unlocking of the user vehicle 10 after the delivery operation has ended are not likely to occur and a problem in that the delivery operation will not end in the validity period is not likely to occur.

Modified Example of Second Embodiment

In the trunk-sharing system according to the second embodiment, when a user has requested a delivery operation in the first delivery type and a request for a cargo-compartment collection operation has not been issued by the user as described above in the first embodiment, there is a likelihood that packaging material removed from a delivery object will not be collected and be accumulated at the location of the user. On the other hand, when a user has requested a delivery operation in the first delivery type, the user can accommodate packaging material removed from a delivery object which was previously received in the interior space of the user vehicle 10 and can cause a pickup and delivery person to automatically collect the packaging material accommodated previously in the interior space at the time of performing an operation of delivering a delivery object in the first delivery type. According to this method, even when a user has requested a delivery operation in the first delivery type, packaging material is not likely to be accumulated at the location of the user and thus it is possible to reduce inconvenience from the user. Collection of packaging material using this method can also be applied when an operation of delivering a delivery object in the second delivery type is performed.

The trunk-sharing system according to the disclosure is not limited to the configurations described in the second embodiment and the modified example of the second embodiment, but may be constructed by a single computer (or server) that can be connected to a network or may be constructed by a plurality of computers (and/or servers) that can be connected to a network. When the trunk-sharing system according to the disclosure is constructed by a plurality of computers (and/or servers), the elements of the trunk-sharing system may be distributed and constructed by two or more computers (and/or servers).

Other Example 1

In the first and second embodiments, the onboard unit includes the key unit and the locking/unlocking device, but the onboard unit may not include the key unit. That is, in the above-mentioned embodiments, a two-step authentication process including an authentication process for terminal authentication information by the key unit and an authentication process for a key ID by the locking/unlocking device is performed. However, the trunk-sharing system may only perform the authentication for the key ID which is performed by the locking/unlocking device. In this case, the locking/unlocking device can have a function of directly communicating with the pickup and delivery communication device (for example, a short-range communication unit). When a collection operation or a delivery operation by a pickup and delivery person is performed, a key ID corresponding to a user vehicle can be acquired from the pickup and delivery management server or the central server by the pickup and delivery communication device, a locking/unlocking signal including the key ID can be transmitted from the pickup and delivery communication device to the locking/unlocking device of the onboard unit, and a process of authenticating the key ID can be performed by the locking/unlocking device. In this case, the key ID which is acquired from the pickup and delivery management server or the central server by the pickup and delivery communication device corresponds to an example of "predetermined authentication information" in the disclosure.

Other Example 2

In the first and second embodiments and Other Example 1, terminal authentication information correlated with permanent device authentication information specified to the key unit or a key ID corresponding to a user vehicle is used as an example of the "predetermined authentication information" in the disclosure, but the disclosure is not limited thereto. For example, when a device capable of communicating with the central server is mounted in a user vehicle, the central server may generate new terminal authentication information whenever a terminal authentication information issuance request is received from the pickup and delivery communication terminal, transmit the generated new terminal authentication information to the pickup and delivery communication terminal, and register device authentication information corresponding to the generated new terminal authentication information in the key unit via the communication device of the user vehicle. In this case, the pickup and delivery communication device can transmit new terminal authentication information received from the central server to the key unit. Then, the key unit can perform authentication of the pickup and delivery communication device by comparing the new terminal authentication information received from the pickup and delivery communication device with the new device authentication information registered by the central server. According to this method, since the predetermined authentication information can be changed for each collection operation or for each delivery operation, it is possible to enhance security when a user uses a trunk-sharing service.

As a method of generating the above-mentioned new terminal authentication information, a method of generating new terminal authentication information in accordance with an algorithm using a key ID corresponding to a user vehicle and time information may be used. In this case, the central server can transmit the new terminal authentication information generated in accordance with the algorithm to the pickup and delivery communication device along with the time information. Accordingly, the pickup and delivery communication device can transmit the new terminal authentication information and the time information received from the central server to the key unit. The key unit can generate device authentication information corresponding to the new terminal authentication information in accordance with the same algorithm as in the central server using the time information received from the pickup and delivery communication device and the key ID registered in advance in the key unit. The key unit can perform authentication of the pickup and delivery communication device by comparing the device authentication information generated in the key unit with the terminal authentication information received from the pickup and delivery communication device. With this method, even when a device capable of communicating with the central server is not mounted in the user vehicle, predetermined authentication information can be changed for reach collection operation or for each delivery operation.

Other Example 3

In the trunk-sharing system according to the first and second embodiments and Other Examples 1 and 2, only a cargo compartment door of a user vehicle 10 may be locked and unlocked in consideration of security in the collection operation or the delivery operation. In a vehicle having a body structure in which a luggage space and a cabin space are not partitioned from each other, for example, a vehicle which is called one box type, since a person can access the cabin space by unlocking the cargo compartment door, there is a likelihood that a user will have concern about security.

Therefore, in such a vehicle having a body structure in which the luggage space and the cabin space are not partitioned, when a cargo compartment door is opened, the trunk-sharing system may capture a moving image of the interior space using a drive recorder which can also image the cabin space or the like and determine whether a person or an object invades into the cabin space from the luggage space based on the captured moving image. When it is determined that a person or an object has invaded into the cabin space from the luggage space, the trunk-sharing system performs storage of the captured moving image, operation of an onboard alarm, notification to the pickup and delivery management server and/or the central server, notification to the user, and the like. On the other hand, when it is determined that a person or an object has not invaded into cabin space from the luggage space, the trunk-sharing system may delete the captured moving image at a time point at which closing and locking of the cargo compartment door has been performed. The trunk-sharing system may transmit the captured moving image to the user terminal regardless of whether a person or an object has invaded into the cabin space from the luggage space as a part of a user service.

The invention claimed is:

1. A trunk-sharing system that uses an interior space of a vehicle as a place in which a delivery object is delivered and received, the trunk-sharing system comprising a server configured to:
   i) acquire a vehicle information including information for identifying the vehicle when a predetermined service request has been issued;
   ii) acquire a predetermined authentication information for locking and unlocking a door of the vehicle based on the vehicle information;
   iii) transmit at least the predetermined authentication information to a terminal which is used by a service provider;
   iv) generate a delivery type designation information in response to a request from a user of the vehicle, the delivery type designation information being for designating one delivery type of:
      a) a first delivery type in which the delivery object in a packaged state is accommodated in the interior space of the vehicle without being unpackaged; and
      b) a second delivery type in which the delivery object is unpackaged, a packaging material removed from the delivery object is collected, and the delivery object in an unpackaged state is accommodated in the interior space of the vehicle; and
   v) transmit the predetermined authentication information and the delivery type designation information to the terminal which is used by the service provider, wherein
   the predetermined service request is a request for using the interior space of the vehicle as the place in which the delivery object is received,
   the service provider is a person who performs an operation of delivering the delivery object,
   the predetermined authentication information includes information for determining a validity period of the predetermined authentication information, and
   the validity period of the predetermined authentication information is set to be longer when the delivery type designation information is information for designating the second delivery type than when the delivery type designation information is information for designating the first delivery type.

2. The trunk-sharing system according to claim 1, further comprising:
   an actuator disposed in the vehicle, and
   circuitry configured to control the actuator based upon the predetermined authentication information.

3. The trunk-sharing system according to claim 1, wherein the server is configured to:
   generate the delivery type designation information as the first delivery type in which the delivery object in the packaged state is accommodated in the interior space of the vehicle without being unpackaged; and
   generate the delivery type designation information as the second delivery type in which the delivery object is unpackaged, the packaging material removed from the delivery object is collected, and the delivery object in the unpackaged state is accommodated in the interior space of the vehicle.

4. The trunk-sharing system according to claim 1, wherein:
   the server is further configured to acquire the vehicle information when the predetermined service request is a request for collecting a packaging material, which has been used to package the delivery object, from the interior space of the vehicle;
   the service provider is a person who performs an operation of collecting the packaging material, which has been used to package the delivery object; and
   the request for collecting the packaging material is issued automatically.

5. The trunk-sharing system according to claim 4, wherein the server is configured to consider that the request for collecting the packaging material is issued when an amount of packaging material accommodated in the interior space of the vehicle is equal to or greater than a predetermined amount.

6. The trunk-sharing system according to claim 4, wherein the server is configured to consider that the request for collecting the packaging material is issued when a total volume of packaging material accommodated in the interior space of the vehicle is equal to or greater than a predetermined volume.

7. The trunk-sharing system according to claim 5, wherein the server is configured to determine the amount of packaging material accommodated in the interior space of the vehicle based upon information read from an IC tag attached to the packaging material accommodated in the interior space.

8. The trunk-sharing system according to claim 5, wherein the server is configured to determine the amount of packaging material accommodated in the interior space of the vehicle based upon images of the interior space of the vehicle.

9. The trunk-sharing system according to claim 6, wherein the server is configured to determine the total volume of packaging material accommodated in the interior space of the vehicle based upon information read from an IC tag attached to the packaging material accommodated in the interior space.

10. The trunk-sharing system according to claim 6, wherein the server is configured to determine the total volume of packaging material accommodated in the interior space of the vehicle based upon images of the interior space of the vehicle.

11. An information processing method for trunk-sharing, the information processing method comprising:
  i) causing a computer to acquire a vehicle information including information for identifying a vehicle when a predetermined service request has been issued;
  ii) causing the computer to acquire a predetermined authentication information for locking and unlocking a door of the vehicle based on the vehicle information;
  iii) causing the computer to transmit at least the predetermined authentication information to a terminal which is used by a service provider;
  iv) causing the computer to generate a delivery type designation information in response to a request from a user of the vehicle, the delivery type designation information being for designating one delivery type of:
    a) a first delivery type in which a delivery object in a packaged state is accommodated in an interior space of the vehicle without being unpackaged; and
    b) a second delivery type in which a delivery object is unpackaged, a packaging material removed from the delivery object is collected, and the delivery object in an unpackaged state is accommodated in an interior space of the vehicle; and
  v) causing the computer to transmit the predetermined authentication information and the delivery type designation information to the terminal which is used by the service provider, wherein
  the predetermined service request is a request for using the interior space of the vehicle as a place in which the delivery object is received,
  the service provider is a person who performs an operation of delivering the delivery object,
  the predetermined authentication information includes information for determining a validity period of the predetermined authentication information, and
  the validity period of the predetermined authentication information is set to be longer when the delivery type designation information is information for designating the second delivery type than when the delivery type designation information is information for designating the first delivery type.

12. A non-transitory computer-readable recording medium storing a program causing a computer to perform a control process for a trunk-sharing system, the control process comprising:
  i) acquiring vehicle information including information for identifying a vehicle when a predetermined service request has been issued;
  ii) acquiring a predetermined authentication information for locking and unlocking a door of the vehicle based on the vehicle information;
  iii) transmitting at least the predetermined authentication information to a terminal which is used by a service provider;
  iv) generating a delivery type designation information in response to a request from a user of the vehicle, the delivery type designation information being for designating one delivery type of:
    a) a first delivery type in which a delivery object in a packaged state is accommodated in an interior space of the vehicle without being unpackaged; and
    b) a second delivery type in which a delivery object is unpackaged, a packaging material removed from the delivery object is collected, and the delivery object in an unpackaged state is accommodated in an interior space of the vehicle; and
  v) transmitting the predetermined authentication information and the delivery type designation information to the terminal which is used by the service provider, wherein
  the predetermined service request is a request for using the interior space of the vehicle as a place in which the delivery object is received,
  the service provider is a person who performs an operation of delivering the delivery object,
  the predetermined authentication information includes information for determining a validity period of the predetermined authentication information, and
  the validity period of the predetermined authentication information is set to be longer when the delivery type designation information is information for designating the second delivery type than when the delivery type designation information is information for designating the first delivery type.

* * * * *